United States Patent [19]

Baumgarten

[11] Patent Number: 5,224,838
[45] Date of Patent: Jul. 6, 1993

[54] GEAR PUMP WITH GROOVER SEALING MEANS

[75] Inventor: Wilfried Baumgarten, Pattensen, Fed. Rep. of Germany

[73] Assignee: Paul Troester Maschinenfabrik, Hannover, Fed. Rep. of Germany

[21] Appl. No.: 863,010

[22] Filed: Apr. 6, 1992

[30] Foreign Application Priority Data

Apr. 7, 1991 [DE] Fed. Rep. of Germany ....... 4111218

[51] Int. Cl.$^5$ ................. F04B 23/08; F04C 29/02; B29C 47/00
[52] U.S. Cl. ................. 417/205; 418/47; 418/77; 418/102; 425/197; 425/382.3; 425/382.4
[58] Field of Search ........ 418/47, 102, 77, 206, 418/205; 425/382.3, 382.4, 197

[56] References Cited

U.S. PATENT DOCUMENTS

| | | | |
|---|---|---|---|
| 642,813 | 2/1900 | Cowen | 425/382.4 |
| 2,767,437 | 10/1956 | Marshall | 425/197 |
| 3,368,799 | 2/1968 | Sluijters | 418/102 |
| 4,336,213 | 6/1982 | Fox | 264/40.1 |
| 4,880,374 | 11/1989 | Hamamura | 425/197 |

FOREIGN PATENT DOCUMENTS

| | | | |
|---|---|---|---|
| 265701 | 9/1970 | U.S.S.R. | 418/206 |
| 726368 | 11/1978 | U.S.S.R. | 418/77 |

*Primary Examiner*—Richard A. Bertsch
*Assistant Examiner*—Roland McAndrews
*Attorney, Agent, or Firm*—Robert E. Burns; Emmanuel J. Lobato

[57] ABSTRACT

A gear pump for pumping viscous material has a housing with an inlet and an outlet and a gear chamber between the inlet and the outlet. A pair of intermeshing gear wheels which are rotatably supported by bearings in the gear chamber of the housing have end faces in rotative contact with abutting faces of the housing. Spiral grooves in end faces of the gear wheels have a direction to move radially outwardly any material entering between end faces of the gear wheels and abutting faces of the housing to prevent such material from reaching the bearings. An integral drive shaft of one of the gears has a helical groove for preventing material from reaching bearings of the drive shaft. The driven gear has a central circular recess in which a bearing stud projects with bearing needles between the stud and the recess in the gear. In one embodiment, the gear pump is mounted on the discharge end of an extruder and interchangeable sieves are provided between the extruder and the gear pump to filter out any foreign objects.

8 Claims, 2 Drawing Sheets

GEAR PUMP WITH GROOVER SEALING MEANS

FIELD OF INVENTION

The invention relates to a gear pump comprising a housing provided with an inlet channel and an outlet channel and two intermeshing gear wheels of which the bearings are sealed against entry of the material being pumped.

BACKGROUND OF THE INVENTION

A gear pump of this kind is known from DE 90 11 156.7 U1. This known gear pump serves for pumping high viscosity hardening fluids. When pumping such fluids, it is necessary to avoid entry of the fluid into the bearings of the gear wheels. Such entry would lead to interruption of the operation of the gear pump since such fluid would harden in the bearings and result in an increased bearing resistance producing strong resistance heating which would lead to carbonization of the material pressed into the bearings, whereby the bearings would freeze and put the pump out of operation. Hence in the gear pump of DE 90 11 156.7 U1, shaft seals and an axially working return screw were provided whereby the gear wheel had a central recess in which there projected a bearing housing which on its out side had a return screw and on its inner side had a packing. The gear wheels are supported by a bearing on only one side, because with this type of bearing, the number of packings and return screws are only half of those required for a double sided bearing. This single sided bearing has, however, the disadvantage that under high pressure acting on the end of the gear wheel the shaft elastically bends in the bearing and the gear wheel is canted in the housing which makes it necessary for the gap between the end face of the bearing and the housing wall to be dimensioned sufficiently great as to permit such canting of the gear wheel. This further leads to a greater leakage flow and thereby to more compound remaining in the housing.

From U.S. Pat. No. 4,336,213 it has become known to provide bearings on both sides of the gear wheels of a gear pump. From DE 328 963 it is known to support a gear wheel on a one sided journal so that the bearing extends into a recess of the gear wheel. This bearing by means of ball bearings on a one sided journal does not have the required precision to make the gap between the end face of the gear wheel and the housing sufficiently narrow as is desired in order to have the least possible amount of the material being pumped enter this gap.

SUMMARY OF THE INVENTION

The present invention avoids the disadvantages of the state of the art. It is the object of the present invention, with simple means to reduce abrasion and form the gear pump so that without loss of durability, difficult to pump rubber mixtures can be pumped satisfactorily.

The invention consists therein that sealing means in the form of conveyor spirals for returning the material being pumped are provided on end faces of the gear wheels in order to isolate the bearings of the gear wheels from the conveyor passage of the material being pumped.

The use of such conveyor spirals on the end faces of the gear wheels of a gear pump provides the advantage that the material being pumped, directly at the location where it enters the space between end faces of the gear wheels and the housing, is subjected to return conveyor action. These positions of penetration are not only at the circumference line on the periphery of the end face of the gear wheel but are at the bases of the tooth gaps out of which the material being pumped is pressed laterally by interengagement of the gear teeth. This material pressed from the gaps between teeth of the gear wheels is under especially high pressure. It is especially important that the return spirals on end faces of the gear wheels prevent this material from entering the gap between end faces of the gear wheels and the housing.

If material already in the gap between the end faces of the gear wheels and the housing wall is to be returned, it is indispensable for this gap to be as small as possible. Such small gap can be achieved in a simple manner by providing an integral bearing supported shaft on one side of the gear wheel and providing in a recess of the gear wheel a trunion which carries a needle bearing for supporting the gear wheel from the inside. Through this bearing support of the gear wheel in the region between the end faces of the gear wheel it is possible to achieve minimal gap width between end faces of the gear wheel and the housing walls.

Further to prevent entry of the material being pumped into the gaps between end faces of the gear wheels and the housing walls it is advantageous to provide means for pressing a lubricant, which is compatible with the mixture being pumped, into the region of the sealing spiral.

BRIEF DESCRIPTION OF DRAWINGS

The essence of the invention will be more fully understood from the following description of preferred embodiments of the invention shown by way of example in the accompanying drawings in which:

FIG. 5 is a sectional view in accordance with the present invention taken along the line 5—5 in FIG. 2.

DESCRIPTION OF PREFERRED EMBODIMENTS

Figure 1:
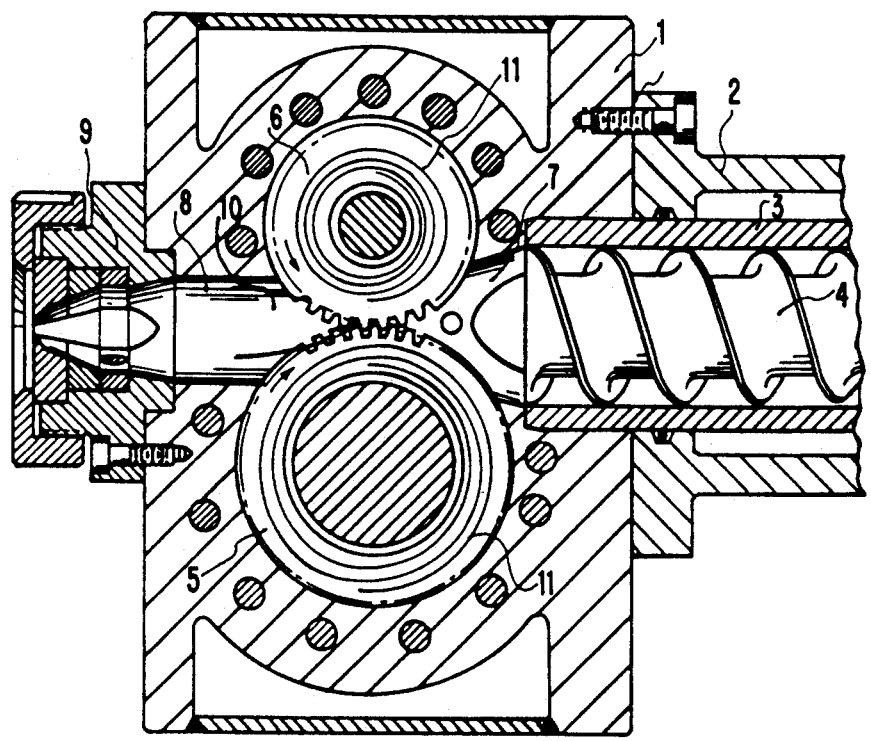
FIG. 1 is a longitudinal section through a gear pump in accordance with the invention.

The gear pump comprises a housing 1 which is secured by a flange joint to the cylinder 2 of an extruder which has a sleeve 3 in which a rotating screw 4 plasticizes the rubber mixture and forwards it into the gear pump. In the interior of the housing 1 of the gear pump, two rotating gears 5 and 6 forward the extrudant from the inlet channel 7 to the outlet channel 8 and from there into the extrusion head 9 which is secured on the housing 1 of the gear pump by a flanged joint. In the walls of the outlet channel 8 which are parallel to the end faces of the gear wheels 5, 6 there is provided a recess 10 in order to forward into the outlet channel the material displaced under high pressure from between the teeth of the gear wheels 5, 6.

Figure 2:
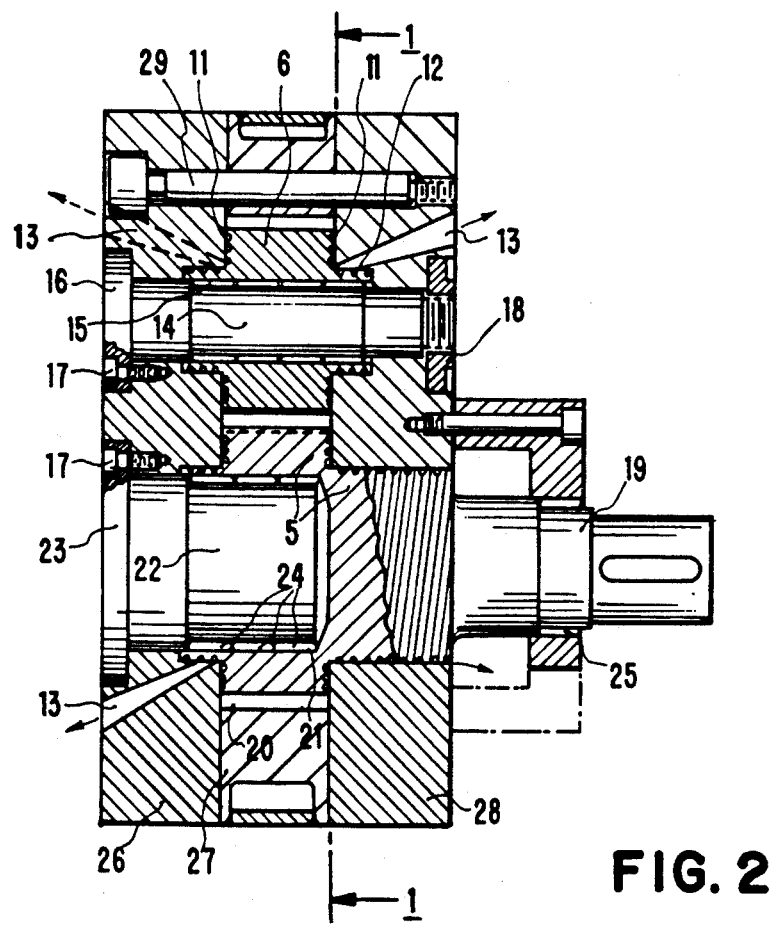
FIG. 2 is a cross section through the gear pump.

As can be seen from FIG. 2, conveyor spirals 11 are arranged on the end faces of the gear wheels and helical conveyor threads 12 are arranged on shaft forming, or hollow journal forming portions of the gear wheels. These conveyor spirals 11 and conveyor threads 12 serve for returning material and indeed the conveyor spirals 11 serves for returning leakage material and the conveyor threads 12 serve for returning lubricant. Under the high pressure which prevails in the conveyor space as also on the lubricant, these conveyed means cannot return all of the material being extruded nor all of the lubricant and it is undesirable that they should. For the purpose of keeping the lubricant as well as the extrudant clean, it is desirable to lead a portion of the leakage stream to the exterior of the gear pump. This purpose is served by channels 13 which advantageously are connected with the grooves arranged in the housing.

The effectiveness of the sealing spiral and the sealing threads can be decisively improved by pressing a mixture compatible material, for example certain thermal plastics, advantageously polyethylene, into the region of the sealing spiral or sealing thread for example with a metering pump. In many cases the leakage outlets can then be eliminated.

The smaller gear wheel 6 is rotatably supported by a shaft 14 which has portions of different diameters. Between the central portion of the shaft 14 and the inner wall of the gear wheel 6, needles 15 of a needle bearing are arranged in four parallel rows. At one end, the shaft 14 has a flange 16 which is secured to the housing 1 by means of screws 17. On its other end the shaft 14 has a thread on which is screwed a nut 18 which is received in a recess in the housing 1.

The gear wheel 5 of larger diameter is connected with a drive shaft 19 or is made integral with such drive shaft. In the region underneath the teeth 20, this shaft 19 is provided with a recess 21 which receives a bearing stud 22. This bearing stud 22 is formed stepped with its median portion seated in a press fit in the housing 1; its one end formed with a flange 23 which is secured to the housing with screws 17. On the end portion extending into the interior of the housing, this bearing stud 22 carries one or more rows of needle bearings 24 which rotatably support the gear wheel 5 directly under the gear teeth. The gear wheel 5 with its unitary drive shaft 19 is thus rotatably supported by needle bearings 24 in the interior of the gear wheel and by needle bearing 25 for the shaft 19.

The housing itself is formed of three parts 26, 27 and 28 which are secured together by screws or bolts 29.

Figure 3:
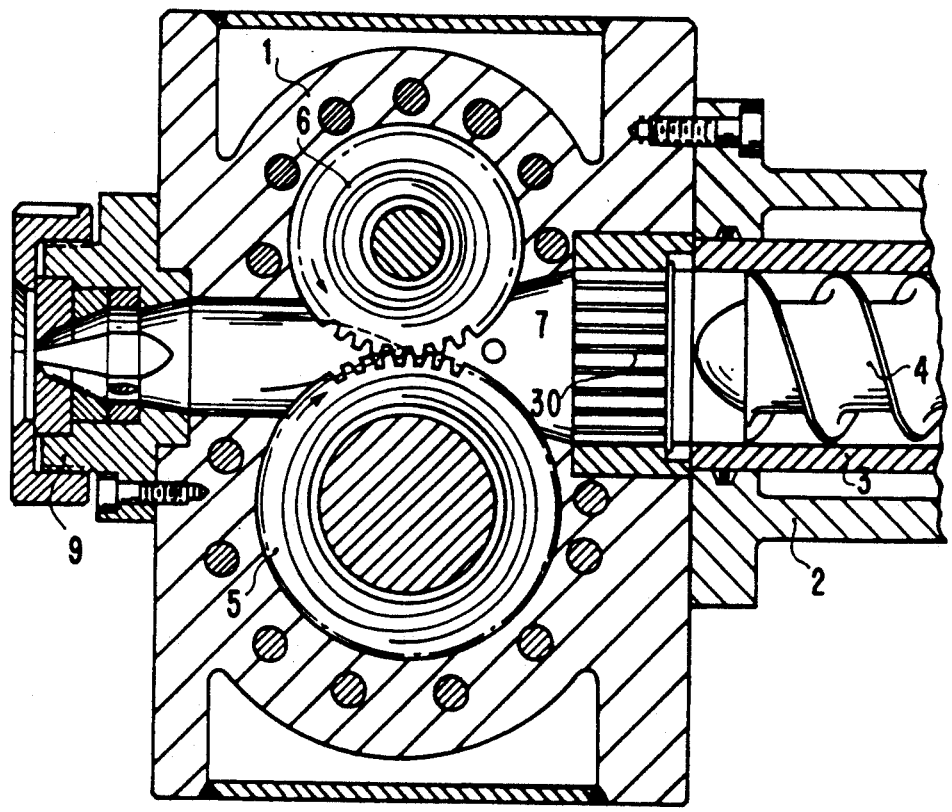
FIG. 3 is a cross section through a gear pump provided with a strainer.
Figure 4:
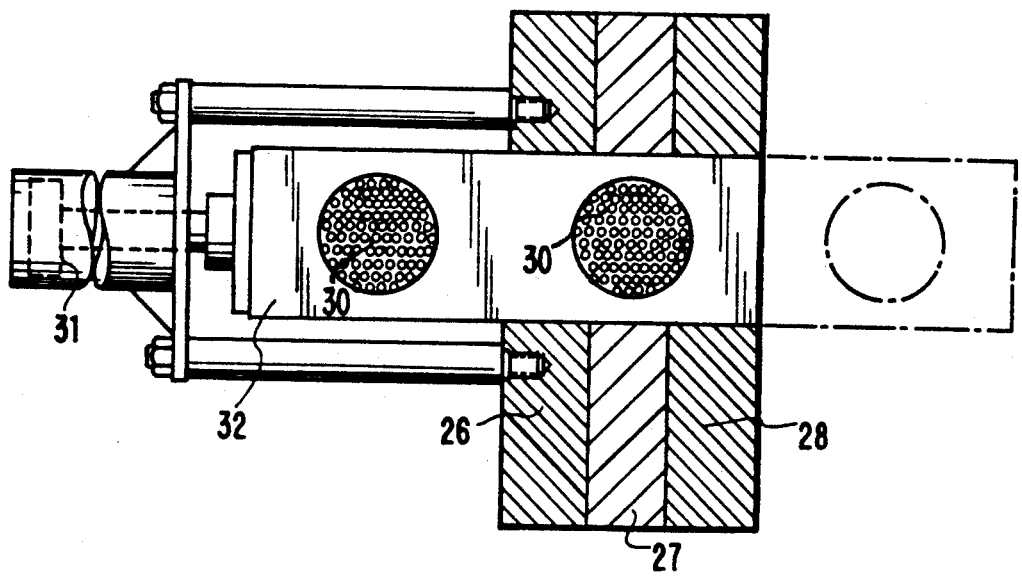
FIG. 4 is a longitudinal section through the strainer.

In the embodiment of FIG. 3, there is arranged in the inlet channel 7 a strainer sieve 30 which serves to keep foreign bodies from entering between the gear wheels 5, 6. From FIG. 4 it is seen that there is provided a sieve changing arrangement, namely a slidable slide 32 which has two strainer sieves 30 and is slidable by a servomotor 31 to bring the two strainer sieves alternately into operative position, whereby one strainer sieve is outside the stream of extrudant and thus accessible for cleaning or replacement.

What I claim is:

1. Gear pump for pumping viscous material, said gear pump comprising a housing having an inlet and an outlet and a gear chamber between said inlet and said outlet, a pair of intermeshing toothed gear wheels in said gear chamber of said housing, said gear wheels having intermeshing gear teeth on their peripheries, central bearing means for rotatably supporting said gear wheels in said housing for rotation to forward said material from said inlet to said outlet, said gear wheels having end faces in rotative contact with abutting faces of said housing, and sealing means for preventing said viscous material from reaching said bearing means, said sealing means comprising spiral grooves in said end faces of said gear wheels, said spiral grooves defining spiral channels between said end faces of said gear wheels and said abutting faces of said housing, said spiral grooves having a direction to move radially outwardly any of said viscous material entering between said end faces of said gear wheels and said abutting faces of said housing and thereby prevent such material from fouling said central bearing means.

2. Gear pump according to claim 1, further comprising an extruder having a cylinder on an end of which said gear pump housing is mounted, said cylinder having a bore with an end thereof joining said inlet of said gear pump housing and a screw rotatable in said bore to propel material from said bore of said extruder into said gear pump housing and further comprising sieve means interposed between said extruder bore and said gear pump housing for screening any foreign objects from said material, said sieve means comprising an elongate slide which is slidable in a channel way in said gear pump housing and a plurality of sieve screens mounted in said slide, said slide being movable between a first position in which a first one of said sieve screens is interposed between said bore of said extruder and said gear chamber of said pump while a second sieve screen is outside said pump and available for cleaning or replacement and a second position in which a second one of said sieve screens is interposed between said bore of said extruder and said gear chamber of said pump and said first sieve screen is outside said pump for cleaning or replacement, and a servo-motor for moving said slide between said first position and said second position.

3. Gear pump according to claim 1, in which one of said gear wheels has an integral drive shaft projecting from one end face of said gear wheel and rotatably received in a bore in said housing, said drive shaft having on an outer circumferential surface of a portion thereof a helical groove having a direction to move toward said end face of said gear wheel any of said viscous material entering between said circumferential surface of said drive shaft and said bore of said housing.

4. Gear pump according to claim 3, further comprising a needle bearing rotatably supporting said drive shaft.

5. Gear pump according to claim 3 in which said one gear wheel has a central circular recess extending into said gear wheel from the end face thereof opposite the end face from which said drive shaft projects and in which a bearing stud rigid with said housing extends into said recess, said gear wheel having an integral cylindrical collar projecting from an end face of said gear wheel and surrounding said bearing stud, said collar being rotatably received in a bore of said housing and having on its outer periphery a spiral groove having a direction to move toward said end face of said gear wheel any material entering between said collar and said bore of said housing.

6. Gear wheel according to claim 5, in which rolling bearing elements are interposed between said bearing stud and said recess.

7. Gear pump for pumping viscous material, said gear pump comprising a housing having an inlet and an outlet and a gear chamber between said inlet and said outlet, a pair of intermeshing toothed gear wheels in said gear chamber of said housing, bearing means for rotatably supporting said gear wheels in said housing for rotation to forward said material from said inlet to said outlet, said gear wheels having end faces in rotative contact with abutting faces sealing means for preventing said material from reaching said bearing means, said sealing means comprising spiral grooves in said end faces of said gear wheels, said spiral grooves defining spiral channels between said end faces of said gear wheels and said abutting faces of said housing, said spiral grooves having a direction to move radially outwardly any material entering between said end faces of said gear wheels and said abutting faces of said housing and thereby prevent such material from fouling said bearing means, at least one of said gear wheel having an integral collar projecting from an end face of said gear wheel and rotatably received in a bore of said housing, said collar having on an outer circumferential surface thereof a helical groove having a direction to move toward said end face of said gear wheel any material entering between said outer circumferential surface of said collar and said bore of said housing.

8. Gear pump according to claim 7, in which said housing has a channel extending from a location adjacent a junction between said collar and said end face of said gear wheel to a relief port for discharging any material entering said channel.

* * * * *